July 10, 1962   C. O. KREUTZER   3,043,041
ELECTRO-FISHING LOW INDUCTANCE IMPULSE CIRCUIT
Filed May 29, 1958   3 Sheets-Sheet 1

INVENTOR.
CONRADIN OTTO KREUTZER
BY Arthur H Robert
ATTORNEY

July 10, 1962 C. O. KREUTZER 3,043,041
ELECTRO-FISHING LOW INDUCTANCE IMPULSE CIRCUIT
Filed May 29, 1958 3 Sheets-Sheet 2

*INVENTOR.*
CONRADIN OTTO KREUTZER
BY
Arthur H Roberts
ATTORNEY

July 10, 1962 C. O. KREUTZER 3,043,041
ELECTRO-FISHING LOW INDUCTANCE IMPULSE CIRCUIT
Filed May 29, 1958 3 Sheets-Sheet 3

INVENTOR.
CONRADIN OTTO KREUTZER
BY Arthur H Robert
ATTORNEY

United States Patent Office 3,043,041
Patented July 10, 1962

3,043,041
ELECTRO-FISHING LOW INDUCTANCE
IMPULSE CIRCUIT
Conradin Otto Kreutzer, Meersburg (Bodensee), Germany, assignor to Fish Products Company, Lewes, Del., a corporation of Delaware
Filed May 29, 1958, Ser. No. 738,686
Claims priority, application Germany Aug. 1, 1957
7 Claims. (Cl. 43—17.1)

In electrical fishing in sea water, it is conventional to discharge short and steep electrical impulses of high peak voltage and current (40,000 to 50,000 peak-amps.) at a low impulse repetition rate (5 to 45 impulses per second) through the sea water in the area of a school of fish to affect and control the fish. Normally these impulses are obtained by discharging a capacitor having a large capacity.

The conventional electro-fishing circuit, as exemplified by the U.S. Patent #2,745,205 to W. Kafka, includes a capacitor charging circuit serially containing a direct current source, an inductive choke coil and an impulse capacitor, and a capacitor discharging circuit serially containing the same impulse capacitor, a pair of electro-fishing electrodes and a switch. For this circuit to operate properly, the natural resonant frequency of the capacitor charging circuit must equal the impulse repetition rate at which the circuit is operated. As the impulse capacitor has a large capacity and the required impulse repetition rate is low, the choke coil must have a large inductance to provide the circuit with the correct resonant frequency. Choke coils having the required inductance have the objection of being unusually large, heavy and expensive.

A circuit, which does not contain a large inductance, is disclosed in my co-pending application Serial No. 418,377, filed March 24, 1954, and now Patent No. 2,836,735. This circuit contains a direct current source, an impulse capacitor, a pair of fishing electrodes and two pairs of switches, each pair of which is alternately closed to reverse the terminal connections of the impulse capacitor in its series circuit with the direct current source and the fishing electrodes. In order for this circuit to operate, both switches in each pair must be simultaneously closed during overlapping time periods of extremely short durations, say one ten-thousandth of a second. This is difficult to do with any type of switch including arc-type tubes or ignitrons.

The principal object of the present invention is to provide a new and novel circuit which advantageously combines the advantages of the aforesaid large and small inductance circuits and eliminates their objections and more particularly to provide a low inductance circuit requiring the closure of no more than a single switch in order to effect the discharge of each electro-fishing impulse.

Other objects of this invention are: to provide a particularly simple and effective electro-fishing circuit; and to provide a relatively light and portable electro-fishing apparatus.

These objects are attained in my improved electro-fishing circuit by charging the fishing impulse capacitor with a pulsating direct current consisting of a series of spaced unidirectional voltage impulses separated from each other by periods of zero voltage and discharging the impulse capacitor through a capacitor discharge circuit including the fishing waters during some or all of said periods of zero voltage. The discharge of the fishing capacitor, during the periods of zero voltage in the capacitor charging circuit, causes the capacitor charging circuit to be connected across the capacitor discharging circuit, which is of extremely low resistance, only when the charging source voltage is zero. In other words, it prevents the charging circuit from being short circuited by the discharge circuit when the source voltage is above zero. Since the zero voltage period separating the charging impulses is much greater in duration than the electro-fishing impulse, it becomes possible to use a single arc-type tube to close the discharge circuit for impulse discharging purposes. This is due to the fact that the arc-type tube has time enough during the zero voltage period, first, to effect the discharge of the impulse and, next, to become extinguished or non-conductive after that discharge is completed and before another unidirectional charging voltage impulse is fed to the fishing capacitor.

The required type of pulsating direct current can be obtained from an alternating current source connected to a rectifier circuit which limits the current flow to the fishing capacitor to only a part or portion of the alternating current cycle instead of allowing current to flow for the entire cycle. A half-wave rectifier does this and a voltage doubler circuit, when under load, also accomplishes this.

When an arc-type tube is used as a switch in the fishing capacitor discharge circuit, its firing electrode is connected in series with a firing capacitor and a gas filled triode. The firing capacitor can be charged by the same electrical source that the fishing capacitor is charged by or it can be charged by an auxiliary source. A firing signal is fed to the grid of the gas triode to close the firing circuit and trigger the arc-type tube during periods of zero voltage of the pulsating direct current. This signal can be obtained from the alternating current source by feeding its alternate half cycle (the half cycle opposite the half cycle fed to the fishing capacitor) either directly to the grid of the gas triode or through a phase shifter to the gas triode grid. The phase shifter is used to shift the phase of the alternate half cycle to cause the triode to trigger the arc-type tube at a selected time during each period of zero voltage of the pulsating direct current.

The repetition rate of the fishing impulses is dependent on the frequency of the pulsating direct current as each fishing impulse takes place during a period of zero voltage of the pulsating direct current. If the fishing capacitor is discharged during each period of zero voltage, the fishing impulse repetition rate will equal the frequency of the pulsating direct current. The fishing impulse repetition rate can be reduced by suppressing the firing of the arc-type tube during one or more periods of zero voltage succeeding each discharge of the fishing capacitor.

The invention is illustrated in the accompanying drawings wherein.

FIG. 1 Embodiment

Figure 1:
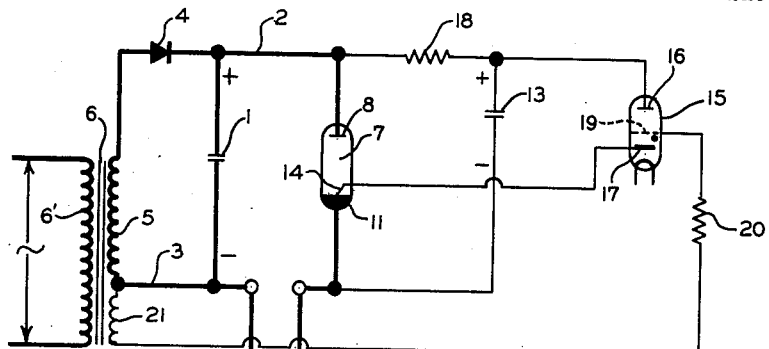
FIG. 1 is a circuit diagram of a simple embodiment of the novel electro-fishing circuit.

The electro-fishing circuit of FIG. 1 is assembled around the conventional fishing impulse capacitor 1 and is designed to charge and discharge this capacitor in a manner whereby the capacitor discharge current can be utilized to influence fish. The impulse capacitor 1 is connected between an upper or positive bus 2 and a lower or negative bus 3.

The capacitor 1 is charged from a half-wave direct current source including, proceeding from the bus 2 to the bus 3, a rectifier 4 connected at one end to the bus 2 and arranged to allow positive current to flow to it and a secondary winding 5 of a transformer 6 interconnected between the other end of the rectifier 4 and the bus 3. The transformer 6 includes a primary winding 6' connected across an alternating current source. By this arrangement, the capacitor charging circuit is a series circuit including the capacitor 1, the bus 2, the rectifier 4, the secondary winding 5, and the bus 3 with the upper terminal of the capacitor 1 connected to the bus 2 being charged positive.

The capacitor 1 is discharged through a circuit including, proceeding from the bus 2 to the bus 3, an arc-type tube switch or ignitron 7 having its anode 8 connected to the bus 2 and a pair of spaced fishing electrodes 9 and 10 with the electrode 9 connected to the ignitron cathode 11 and the electrode 10 connected to the bus 3. The immersion of the electrodes 9 and 10 in sea water completes the circuit therebetween and impresses the discharge of the capacitor 1 on the sea water. This arrangement disposes the capacitor discharge circuit as a series circuit including the capacitor 1, the bus 2, the ignitron 7, the fishing electrode 9, the sea water, the fishing electrode 10 and the bus 3.

The ignitron 7 is fired or made conductive by the discharge of a firing capacitor 13 flowing through a series circuit including, proceeding from the ignitron cathode 11 to the ignitron firing electrode 14, the firing capacitor 13 connected at one end to the ignitron cathode 11 and a gas filled triode or thyratron 15 interconnecting the other end of the firing capacitor 13 to the firing electrode 14 of the ignitron 7. The thyratron 15 has its plate or anode 16 connected to the other end of the firing capacitor 13 and its cathode 17 connected to the firing electrode 14 of the ignitron 7. The firing capacitor 13 is charged from the buses 2 and 3, the same as the much larger fishing impulse capacitor 1 and has its upper end, opposite its lower end connected to the ignitron cathode, connected through a resistor 18 to the bus 2. The resistor 18 controls the charging rate of the firing capacitor 13 and restricts the fishing impulse capacitor 1 from discharging appreciably through the ignitron firing circuit. The bias voltage on the grid 19 of the thyratron 15 controls the flow of current in the firing circuit and, hence, controls the firing of the ignitron 7.

The thyratron grid 19 receives its control voltage through a series circuit, including, proceeding from the thyratron grid 19 to its cathode 17, a resistor 20 connected at one end to the thyratron grid 19, a secondary winding 21 on the transformer 6 having its lower end connected to the other end of the resistor 20, the bus 3 connected to the upper end of the secondary winding 21, the fishing electrodes 10 and 9 and the sea water between them, and the cathode 11 and firing electrode 14 of the ignitron 7. The secondary winding 21 is arranged so that it supplies an alternating voltage to the thyratron grid 19 that is 180 degrees out of phase with the voltage supplied to the rectifier 4 by the secondary winding 5.

Operation of FIG. 1 Embodiment

Figure 2:
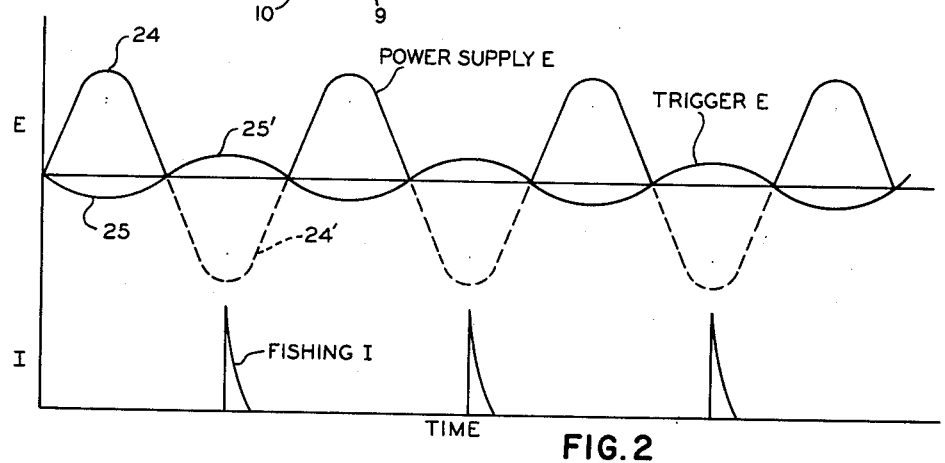
FIG. 2 is a wave-form diagram of some of the voltages and currents occurring in FIG. 1.

The operation of the FIG. 1 circuit is explained in connection with the curves of FIG. 2 wherein the horizontal co-ordinate represents time and the vertical co-ordinates represent voltages indicated as E and current indicated as I. The large curve marked power supply E represents the alternating voltage supplied by the winding 5 to the rectifier 4. The rectifier 4 conducts the positive pulses 24, indicated in solid lines, of the power supply E and blocks current during the negative pulses 24' indicated in dotted lines. The smaller curve marked trigger E is the alternating voltage supplied by the winding 21 to the grid 19 of the thyratron 15. The spaced impulses marked fishing I represent the current impulses discharged between the fishing electrodes 9 and 10.

We assume that the fishing electrodes 9 and 10 are immersed in sea water to provide an electrical connection between them and that the transformer 6 has its primary winding energized with an alternating current having a frequency equalling the desired fishing impulse repetition rate.

A first positive voltage pulse 24 of the power supply E is applied to the rectifier 4 which allows current to flow to charge the fishing capacitor 1 and the firing capacitor 13 through the resistor 18. Current continues to flow, during the pulse 24, until the capacitors 1 and 13 become substantially charged. At the same time, the negative voltage pulse 25 of the trigger E is supplied to the grid 19 of the thyratron 15 to keep it from conducting and firing the ignitron 7.

The power supply E now falls to zero and continues into a negative pulse 24', shown in dotted lines. The rectifier 4 now blocks current from flowing. At the same time, the trigger E returns to zero and rises into a positive pulse 25'. When the positive pulse 25' rises above the bias cut-off voltage of the thyratron 15, the thyratron becomes conductive and discharges the firing capacitor 13 across the firing electrode 14 and cathode 11 of the ignitron 7 which, in turn, fires the ignitron, rendering it conductive, and the fishing capacitor 1 discharges across the fishing electrodes 9 and 10 in the form of a fishing I impulse shown in FIG. 2. The ignitron 7 remains conductive until the discharging voltage across it drops below about 15 volts, depending upon the extinguishing voltage of the particular type of ignitron. Consequently, the discharge circuit of the capacitor 1 automatically opens at the end of the fishing I impulse. Due to the rectifier 4 blocking current flow from the winding 5, the power supply E is not short circuited across the ignitron 7 and the fishing electrodes 9 and 10 during the discharge of the fishing capacitor 1. This operation is periodically repeated to generate each fishing I impulse.

FIG. 3 Embodiment

This embodiment is similar to FIG. 1 wtih the exception that the charging circuit for the fishing capacitor is a voltage doubler circuit, instead of a half-wave rectifier circuit, and the firing capacitor is charged from a separate winding through another voltage doubler circuit.

In particular, the charging circuit for the fishing capacitor 1 contains, in addition, to the secondary winding 5 and the rectifier 4, a voltage doubling capacitor 27 interconnected between the lower end of the winding 5 and the bus 3 and a second rectifier 28 interconnected between the bus 3 and the upper end of the winding 5. This is a conventional cascade voltage doubler circuit so it should suffice to say that the second rectifier 28 conducts charging current to the voltage doubling capacitor 27 during the time that the recifier 4 is blocking current flow and, alternately, the charged voltage of the capacitor 27 is added to the voltage of the winding 5 during the time that the rectifier 4 is conducting.

The firing capacitor 13 is charged from a voltage doubler circuit comprising a secondary winding 5' on the transformer 6, a voltage doubling capacitor 29 and a pair of rectifiers 30 and 31. The charging voltage for the firing capacitor 13 is in phase with the charging voltage for the fishing capacitor 1 and the operation of the charging circuit for the firing capacitor 13 is identical with the operation of the charging circuit for the capacitor 1.

Figure 3:
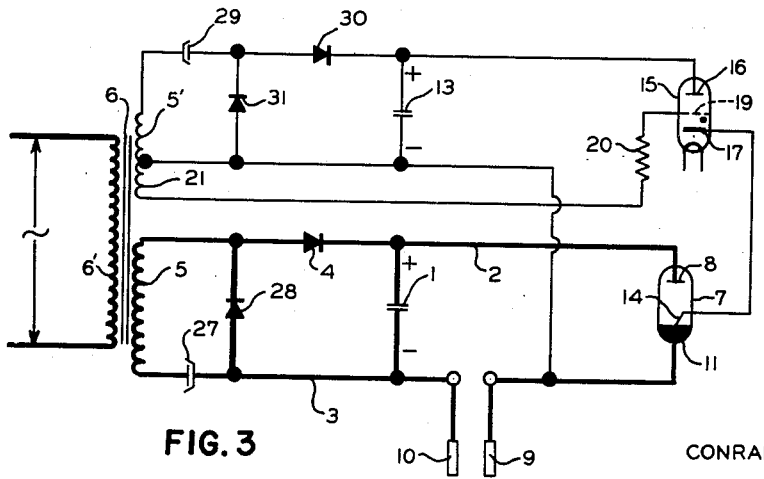
FIG. 3 is a circuit diagram of a second embodiment utilizing a voltage doubler power supply.

The operation of the FIG. 3 circuit is shown in FIG.

Figure 4:
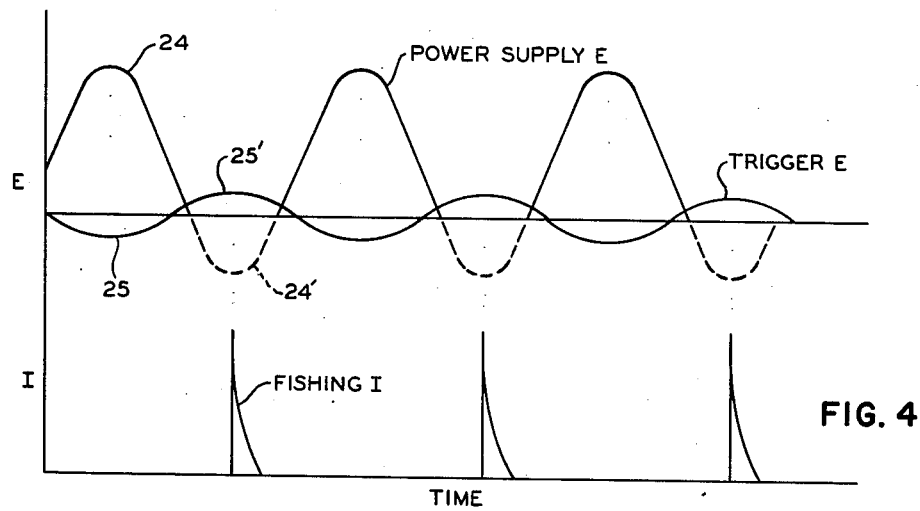
FIG. 4 is a wave-form diagram of some of the voltages and currents in FIG. 3.

4. The only difference between FIG. 4 and FIG. 2 is that the power supply E is asymmetrical with the positive pulse 24 being larger than the negative pulse 24'. Otherwise, the operation of the FIG. 3 circuit is identical with the FIG. 1 circuit.

One advantage of the FIG. 3 circuit over the FIG. 1 circuit is the higher voltage of the fishing I impulse obtainable using the same transformer 6. In addition, the secondary winding 5 is not under a direct current load in FIG. 3, because of the voltage doubling capacitor 27 blocking direct current flow through it.

FIG. 5 Embodiment

This circuit is the same as the FIG. 3 circuit with the exception that the primary winding of the transformer 6 is energized from a vibrator power supply and the ignitron 7 is replaced by a pair of vibrating contacts.

In particular, the upper and lower ends of the primary winding 6' of the transformer 6 are connected respectively to an opposite pair of stationary contacts 33 and 34. A battery 35 is interconnected between the center tap on the primary winding 6' and a periodically moving contact 36 vibrating between the contacts 33 and 34. The moving contact 36 is vibrated by a conventional mechanism such as an electro-magnet driven reed or a rotating cam. The alternate engagement of the moving contact 36 with the stationary contacts 33 and 34 flows current from the battery 35 through the primary winding 6' in alternate directions to energize the transformer 6 with an alternating current. This operation is the same as in a conventional vibrator power supply.

The fishing capacitor 1 is connected between the buses 2 and 3. In the charging circuit for the fishing capacitor 1, the secondary winding 5 of the transformer 6 is connected to a voltage doubler circuit that is identical to the FIG. 3 circuit containing the rectifiers 4 and 28 and the voltage doubling capacitor 27.

In the discharge circuit for the fishing capacitor 1, the ignitron 7 of FIG. 3 is replaced by a pair of contacts, a stationary contact 37 connected to the bus 2 and a moving contact 38 connected to the fishing electrode 9. The moving contact 38 is ganged with the moving contact 36 to vibrate with it. The fishing electrode 10 is interconnected by a current limiting inductive choke 39 to the bus 3 to keep arcs from being drawn between the contacts 37 and 38 immediately prior to their closing.

Figure 5:
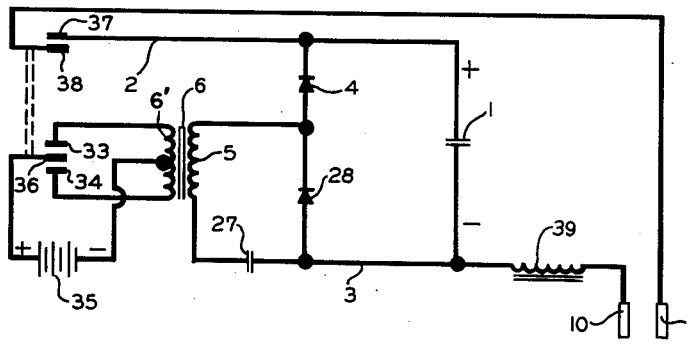
FIG. 5 is a circuit diagram of a third embodiment utilizing a vibrator.

The FIG. 5 circuit is arranged, the same as previous circuits, so that a positive voltage pulse 24 of the power supply E applied to the rectifier 4 results in current flowing to charge the fishing capacitor 1 during the time that the contacts 37 and 38 are open and, alternately, a negative voltage pulse 24' of the power supply E applied to the rectifier 4 results in current being blocked, by the rectifier 4, during the time that the contacts 37 and 38 are closed to discharge the fishing capacitor 1 across the fishing electrodes 9 and 10.

FIG. 6 Embodiment

This circuit is the same as the FIG. 1 circuit with the exception that it contains an additional timing circuit to block the ignitron 7 from being fired during one or more of the negative pulses 24' of the power supply E following the discharge of a fishing I impulse. In the preceding circuits, a fishing I impulse is discharged during each cycle of the power supply E. This circuit suppresses a selected number of the fishing I impulses relative to the power supply E cycles to reduce the fishing I impulse repetition rate while the power supply E frequency remains constant.

Figure 6:
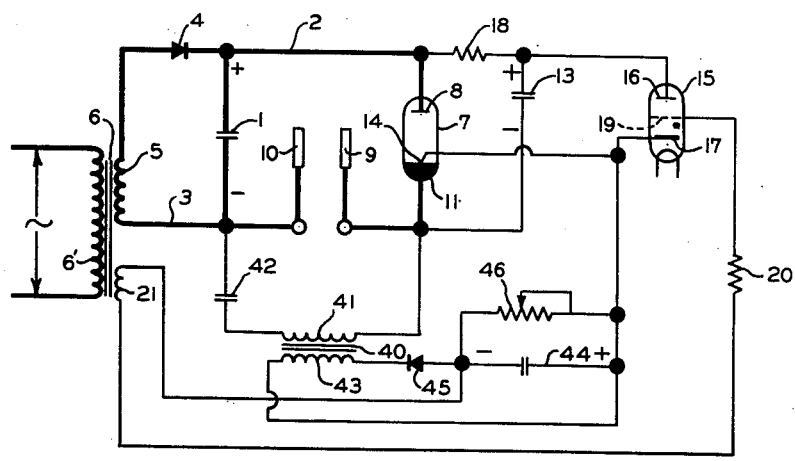
FIG. 6 is a circuit diagram of a fourth embodiment utilizing a timing circuit for adjusting the fishing impulse repetition rate.

The timing circuit in FIG. 6 includes a timing transformer 40 having its primary winding 41 connected at one end to the fishing electrode 9 and connected at the other end through a blocking capacitor 42 to the fishing electrode 10. The capacitor 42 blocks direct current from flowing through the primary winding 41. The secondary winding 43 of the transformer 40 is connected in series with a timing capacitor 44 and a timing rectifier 45 with the rectifier being connected between the negatively charged pole of the timing capacitor and the secondary winding 43. An adjustable timing resistor 46 is shunted across the timing capacitor 44 to discharge it at a selected rate, depending on the adjustment of the resistor 46. The positively charged pole of the timing capacitor 44 is connected to the cathode 17 of the thyratron 15 and its negatively charged pole is connected to the upper end of the secondary winding 21 on the transformer 6 which has its lower end connected through the resistor 20 to the grid 19 of the thyratron 15. As a result of being connected between the cathode 17 and grid 19 of the thyratron 15, a charge on the timing capacitor 44 applies a negative biasing voltage to the thyratron grid 19 and, if the charge is sufficient, keeps the thyratron from conducting when a positive pulse 25' is applied to the grid 19 by the trigger E, supplied by the winding 21.

Figure 7:
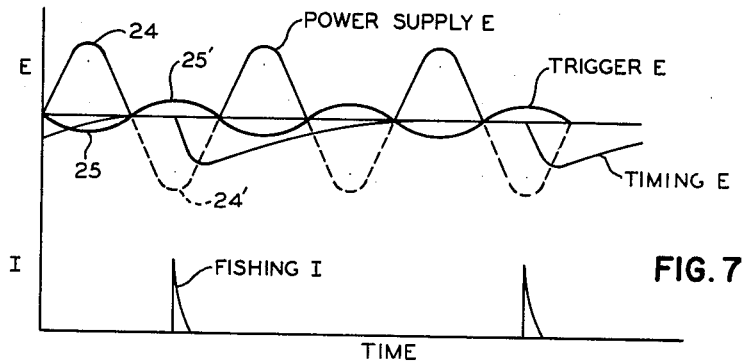
FIG. 7 is a wave-form diagram of some of the voltages and currents in FIG. 6.

The operation of the FIG. 6 circuit is illustrated in the curves of FIG. 7 and is identical with the operation of the FIG. 1 circuit until one fishing I impulse is discharged through the fishing electrodes 9 and 10. The discharge of this fishing I impulse flows a current through the primary winding 41 of the timing transformer 40, causing a current to be induced in the secondary winding 43 and charge the timing capacitor 44. The timing capacitor 44 immediately starts discharging through the timing resistor 46 at a selected rate, depending on the adjusted resistance of the resistor 46.

The negative bias voltage applied to the grid 19 of the thyratron 15 by the charge of the timing capacitor 44 is illustrated in FIG. 7 by the negative curve marked timing E. FIG. 7 illustrates that the timing E is still sufficient during the next positive pulse 25' of the trigger E, following the discharge of the fishing I impulse, to keep the thyratron 15 from conducting and firing the ignitron 7. Hence, the fishing I impulse that would normally be discharged at this time, in the previous circuits, is suppressed.

However, FIG. 7 shows that when the third positive pulse 25' of the trigger E occurs, the charge on the timing capacitor 44 has leaked off sufficiently to again allow the trigger E to drive the thyratron 15 to conduction and fire the ignitron 7 to discharge another fishing I impulse. The resistor 46 can be adjusted to discharge the timing capacitor 44 at a slower rate whereby two or more successive fishing I impulses may be suppressed, instead of only one impulse as illustrated in FIG. 7.

FIG. 8 Embodiment

This circuit is a combination of the fishing circuits of FIG. 3 and FIG. 6 plus an additional trigger circuit for the thyratron 15 which is adjustable to vary the instant of triggering the thyratron during the negative pulse 24' of the power supply E. This triggering circuit can be adjusted to fire the ignitron 7 at the beginning of the negative pulse 24' in order to obtain the full time period of the negative pulse 24' for discharging the fishing capacitor 1 and extinguishing the ignitron 7 before the following positive pulse 24 of the power supply E.

Figure 8:
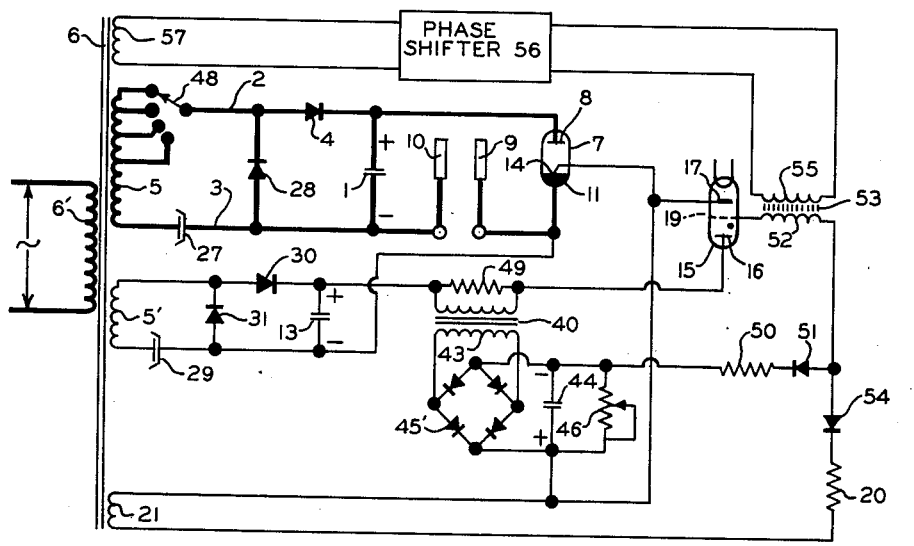
FIG. 8 is a circuit diagram of a fifth embodiment which combines the second and fourth embodiments with an additional means for varying the discharge instant of the fishing impulse capacitor within the period that the charging voltage of the power supply is not impressed on the capacitor.

Comparing FIG. 8 with the FIG. 3 circuit, the charging and discharging circuits for the fishing capacitor 1 of FIG. 8 are identical with the FIG. 3 circuit. The charging circuit includes the voltage doubler comprising the secondary winding 5, of the transformer 6, the voltage doubling capacitor 27 and the two rectifiers 4 and 28. FIG. 8 also illustrates a switch 48 movable between a series of contacts connected to different taps on the winding 5 to vary the voltage output. The discharging circuit for the fishing capacitor includes the buses 2 and 3, the ignitron 7 and the fishing electrodes 9 and 10.

The charging and firing circuit for the ignitron firing capacitor 13 of FIG. 8 is also the same as FIG. 3 and includes a voltage doubler containing the winding 5', the capacitor 29, the two rectifiers 30 and 31 and the thyratron 15.

The timing circuit of FIG. 8 is a little different from the timing circuit of FIG. 6. In FIG. 8, the primary winding 41 of the timing transformer 40 is connected across a resistor 49 which, in turn, is connected in series between the thyratron plate 16 and the rectifier 30 of the charging circuit for the firing capacitor 13. By this arrangement, the timing transformer is energized each time the firing capacitor fires the ignitron 7.

The secondary winding 43 of the timing transformer 40 is connected across the input terminals of a bridge rectifier 45', which replaces the half-wave rectifier 45 of FIG. 6, and the output terminals of the bridge rectifier 45' are connected across the timing capacitor 44. The adjustable resistor 46 is shunted across the timing capacitor 44, the same as in FIG. 6, for discharging it at a selected rate.

The positively charged pole of the timing capacitor 44 is connected to the cathode 17 of the thyratron 15 and its negatively charged pole is connected to the thyratron grid 19 through a resistor 50, a rectifier 51 and the secondary winding 52 of a triggering transformer 53, the purpose of which will be described later. By this connection, the charge on the timing capacitor 44 adds to the negative biasing voltage on the thyratron grid 19 to keep the thyratron 15 from conducting, the same as in the FIG. 6 circuit.

The thyratron triggering circuit of FIG. 6 is changed to a trigger check circuit in FIG. 8. The trigger check circuit of FIG. 8 includes the secondary winding 21, of the transformer 6, having its upper end connected to the cathode 17 of the thyratron 15 and its lower end connected to the thyratron grid 19 through the resistor 20, a rectifier 54 and the secondary winding 52 of the triggering transformer. The rectifier 54 is arranged to block the positive currents flowing in the trigger check circuit. Consequently, only the negative voltage pulses of the winding 21 are applied to the thyratron grid 19. These negative voltage pulses keep the thyratron from firing during the positive pulses of the power supply E. The back-to-back arrangement of the rectifiers 51 and 54 prevent the timing capacitor 44 from discharging through and being charged by the winding 21.

The thyratron triggering circuit of FIG. 8 includes the triggering transformer 53 which has its secondary winding 52 connected to the thyratron grid 19, as already mentioned. The primary winding 55 of the triggering transformer 53 is connected across the output terminals of an adjustable phase shifter 56 energized from a secondary winding 57 on the transformer 6.

The triggering transformer 53 is a saturable core transformer, sometimes called a peaking transformer. When a sine wave is fed to the primary winding 55 of the saturable core transformer 53, the transformer is saturated most of the time due to the current flowing in the winding 55 and, as a result, does not induce a current in its secondary winding 52. However, during the time that the sine wave current crosses its zero axis, the transformer 53 momentarily becomes unsaturated and a peaked current impulse is induced in the secondary winding 52. The FIG. 8 circuit uses these peaked impulses to trigger the thyratron 15. The phase shifter 56 can be adjusted to shift these triggering impulses relative to the power supply E for firing the ignitron 7 at a selected instant during the period of the negative pulse 24' of the power supply E.

Figure 9:
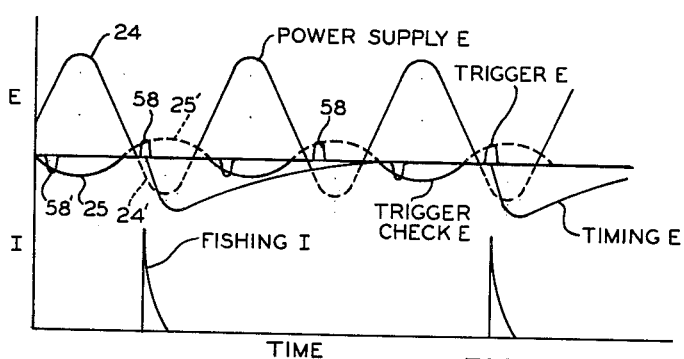
FIG. 9 is a wave-form diagram of some of the voltages and currents in FIG. 8.

The operation of the FIG. 8 circuit is illustrated in the curves of FIG. 9. The small sine wave that was the trigger E of the FIG. 6 circuit is now the trigger check E and the trigger E is a series of peaked positive pulses 58. The trigger E also contains a series of small peaked negative pulses 58' which perform no purpose. The power supply E is identical with the FIG. 3 circuit and the timing E is identical with the FIG. 6 circuit.

During a positive pulse 24 of the power supply E, the fishing capacitor 1 and firing capacitor 13 are charged while the negative pulse 25 of the trigger check E keeps the thyratron 15 from being triggered. This is the same action as is found in the FIG. 3 circuit.

The power supply E continues into its negative pulse 24' while the positive pulse 25' of the trigger check E, indicated in dotted lines, is suppressed by the rectifier 54. Near the beginning of the negative pulse 24' of the power supply E, a positive trigger pulse 58 of what is now the trigger E is applied to the thyratron grid to drive the thyratron 15 to conduction whereby the firing capacitor 13 discharges to fire the ignitron 7 and discharge a fishing I impulse. During the discharge of the firing capacitor 13, the timing capacitor 44 is charged through its timing transformer 40 to apply a negative biasing voltage to the thyratron grid 19. This action is similar to the FIG. 6 circuit.

FIG. 9 illustrates that during the next negative pulse 24' of the power supply E, the timing E of the timing capacitor 44 is still sufficient to keep the thyratron 15 from being triggered by the positive pulse 58 of the trigger E. Consequently, the fishing I impulse, which would normally be discharged at this time, is suppressed.

In FIG. 9, the timing E is low enough during the third negative pulse 24' of the power supply E to allow the thyratron 15 to again be triggered to fire the ignitron 7 and discharge another fishing I impulse. As in the FIG. 6 circuit, the resistor 46 can be adjusted to suppress the desired number of fishing I impulses following a discharged fishing I impulse to vary the impulse repetition rate relative to the frequency of the power supply E.

The phase shifter 56 can be adjusted to cause the positive pulse 58 of the trigger E to be discharged at a selected instant during the period of the negative pulse 24' of the power supply E. Normally, the trigger pulse 58 is discharged at the beginning of the negative pulse 24' so that the fishing I impulse can be discharged and the ignitron 7 extinguished before the next positive pulse 24 of the power supply E.

Having described my invention, I claim:

1. An electro-fishing circuit for energizing a pair of spaced electro-fishing electrodes, comprising:
   (a) an A.C. voltage source;
   (b) a first or voltage doubling capacitor serially connected to said A.C. source and cooperating therewith to provide a higher voltage source;
   (c) a first half wave supply circuit for supplying said voltage doubling capacitor with a charging voltage from said A.C. source during cycle alternations in one direction and with zero charging voltage during cycle alternations in the opposite direction;
   (d) a second or electro-fishing impulse capacitor;
   (e) a second half wave supply circuit for supplying said second capacitor with a charging voltage from said higher source during cycle alternations in said opposite direction only and with zero charging voltage during cycle alternations in said one direction;
   (f) a discharge circuit operative, when closed, to discharge said second capacitor across said electro-fishing electrodes; and
   (g) means for closing and opening said discharge circuit during intervals respectively corresponding to said cycle alternations in said one direction and said opposite direction.

2. The circuit of claim 1 wherein said first half wave supply circuit comprises said voltage doubling capacitor connected in series with a first rectifier and placed across said A.C. source.

3. The circuit of claim 1 wherein said second half wave supply circuit comprises said second capacitor connected in series with a second rectifier and placed across said higher voltage source.

4. The circuit of claim 3 wherein said first half wave supply circuit comprises said first capacitor connected in series with a first rectifier and placed across said A.C. source.

5. The electro-fishing circuit of claim 1 wherein:
said discharge circuit is opened and closed by a control switch;
said switch closing means includes an auxiliary circuit which is inoperative to close said control switch during said cycle alternations in said opposite direction but which, unless blocked, is operative to close said control switch during cycle alternations in said one direction; and
blocking means operative, in response to the switch closing operation of said auxiliary circuit during a given cycle alternation in said one direction, to block said auxiliary circuit and thereby render it inoperative during one or more succeeding cycle alternations in said one direction.

6. The electro-fishing circuit of claim 5 wherein:
said discharge circuit control switch is in the form of an arc type tube;
said auxiliary circuit is in the form of a firing circuit for said arc type tube; and
said blocking means is in the form of a timing circuit.

7. The electro-fishing circuit of claim 6 wherein:
said auxiliary or firing circuit includes a triode rendered conductive and non-conductive by appropriate changes in the bias on its grid; and
said timing circuit is energized during one operation of said auxiliary or firing circuit to impose a blocking bias on said triode to render it non-conductive for a selected time interval.

References Cited in the file of this patent

UNITED STATES PATENTS

| | | |
|---|---|---|
| 2,426,037 | Mahoney et al. | Aug. 19, 1947 |
| 2,605,742 | Burkey | Aug. 5, 1952 |
| 2,745,205 | Kafka | May 15, 1956 |
| 2,850,832 | Kreutzer | Sept. 9, 1958 |
| 2,850,833 | Kreutzer | Sept. 9, 1958 |

FOREIGN PATENTS

| | | |
|---|---|---|
| 836,416 | Germany | Apr. 10, 1952 |
| 851,700 | Germany | Oct. 6, 1952 |
| 868,992 | Germany | Mar. 2, 1953 |